United States Patent [19] [11] 4,299,702
Bairinji et al. [45] Nov. 10, 1981

[54] LIQUID SEPARATION APPARATUS

[75] Inventors: Riyoichi Bairinji, Ohtsu; Tatsuo Kawabata, Kyoto; Tatsundo Tanaka, Ohtsu, all of Japan

[73] Assignee: Toray Industries, Inc., Tokyo, Japan

[21] Appl. No.: 39,651

[22] Filed: May 16, 1979

[30] Foreign Application Priority Data

May 22, 1978 [JP] Japan .................................. 53-60066

[51] Int. Cl.³ ............................................ B01D 31/00
[52] U.S. Cl. ................................ 210/433.2; 210/321.5
[58] Field of Search ........................ 55/16, 158, 218; 210/96, 321, 335, 456, 433 M, 435, 336, 494 M, 321.5

[56] References Cited

U.S. PATENT DOCUMENTS 3,668,837 6/1972 Gross .................................... 55/158
3,933,645 1/1976 Kanamura et al. ............. 210/321 R
4,033,878 7/1977 Foreman et al. ............... 210/336 X
4,083,780 4/1978 Call .................................... 210/23 H Primary Examiner—S. Leon Bashore
Assistant Examiner—Ferris H. Lander
Attorney, Agent, or Firm—Miller & Prestia

[57] ABSTRACT

Disclosed is a liquid separation apparatus of spiral type including a membrane module comprising a hollow mandrel having at least a hole, at least one pair of semipermeable membrane sheets and at least one pair of first and second spacing layers, said membrane sheets and spacing layers being wound about said mandrel, said first spacing layer forming, with said membrane sheets, a first passage for a permeated solution to be discharged therefrom into the interior of said mandrel through said hole, said second spacing layer forming, with said membrane sheets, a second passage for a feed solution or a nonpermeated solution having a first opening on the circumference of said module and an axial opening in the vicinity of said mandrel, said second spacing layer consisting of an inner layer portion in the vicinity of said mandrel and the remaining outer layer portion, said inner layer portion having an axial sectional area or a thickness substantially larger than that of said outer layer portion.

12 Claims, 6 Drawing Figures

LIQUID SEPARATION APPARATUS

BRIEF DESCRIPTION OF THE INVENTION

The present invention relates to an improved liquid separation apparatus of spiral type employing semipermeable membrane sheets, between which a spacing layer is located, and utilizing the principle of reverse osmosis or ultra-filtering for separating a desired liquid component, i.e. a solvent or a solute, from a pressurized feed solution. Particularly, the present invention is directed to a liquid separation apparatus of spiral type, which is characterized by a passage for the feed solution or the nonpermeated solution, which passage is improved in that occurrence of an unequally distributed fluid flow in the passage, leading to production of the phenomenon of polarized concentration, is effectively prevented without a complicated design of the apparatus presenting difficulty in fabrication.

BACKGROUND OF THE INVENTION

Well known, proposed apparatus of various types, is a liquid separation apparatus of spiral type, employing reverse osmosis, which can be operated with a high efficiency of liquid separation. The spiral type apparatus comprises at least two semipermeable membrane sheets which form an envelope having an open end, and one kind of spacing layer for a first passage for a permeated solution and another kind of spacing layer for second passage for a feed solution or a nonpermeated solution. The membrane envelope and the two kinds of spacing layers are spirally wound about a hollow mandrel having at least one hole. The first passage is formed inside of the membrane envelope and communicates with the interior of the hollow mandrel through the hole, while the second passage is formed outside of the membrane envelope.

The specification of U.S. Pat. No. 3,367,504 discloses one kind of spiral type apparatus, wherein the second passage for the feed solution is arranged so that the feed solution is forced to flow from the spiral edges of the membrane sheets and pass through the second passage in a direction parallel to the axis of the mandrel; while the permeated liquid from the feed solution passes through the membrane sheets into the first passage by reverse osmosis and flows spirally through the first passage, and is discharged from the first passage into the hollow mandrel. This kind of apparatus may be referred to as axial-spiral type apparatus.

The other kind of spiral type apparatus is disclosed in the specification of U.S. Pat. No. 3,933,645 and may be referred to as spiral-spiral type apparatus. The spiral-spiral type apparatus is designed so that the second passage for the feed solution has an inlet opening elongated in the axial direction at the outer edges of the entire lengths of the sheets and an axial outlet opening at the spiral edges of the sheets in the vicinity of the surface of the mandrel. The first and second passages are closed at the opposite spiral edges of the sheets over most of the spiral lengths, except for the partial lengths where the axial outlet opening is formed. In this apparatus, the feed solution, under increased pressure, passes spirally in a direction perpendicular to the axis through the second passage in contact with the sheets on a plane perpendicular to the axis, while a solution having a concentrated solvent permeates from the feed solution by reverse osmosis through the sheets into the first passage. The resultant solution having a concentrated solute, that is, the nonpermeated solution, flows spirally in a direction perpendicular to the axis through the spiral second passage and, then, is forced to change its course axially in the vicinity of the surface of mandrel to flow that surface through the second passage, and to flow out of the axial outlet of the second passage, while the perpeated solution is forced to flow into the interior of the mandrel. The formerly mentioned axial-spiral type apparatus has the disadvantage that it exhibits a relatively low performance with a low rejection, which is a function of the module, and with a low recovering ratio, which ratio is defined by the ratio of a volume of the permeated solution to the feed solution. This is caused by inherent problems in that the sectional area of the feed solution passage is apt to vary considerably owing to the fluid pressure of the feed solution or the nonpermeated solution and, thus, the flow velocity varies on a plane perpendicular to the axial direction. This results in an unequally distributed fluid flow in the second passage for the feed solution, and produces the unfavorable phenomenon of polarized concentration. Such a phenomenon causes a decrease in rejection which is calculated by the following formula.

$$R = 1 - \frac{C_S}{(C_F + C_o)/2} \times 100$$

wherein:
R: rejection in percentage;
$C_F$: concentration of solute in nonpermeated solution after discharge;
$C_S$: concentration of solute in permeated solution after discharge.
$C_o$: concentration of solute in feed solution The spiral-spiral type apparatus is advantageous in its performance, compared with the axial-spiral type apparatus. This is because such unequal distribution of the flow velocity as in the axial-spiral type apparatus does not occur in the spiral-spiral type apparatus. However, the spiral-spiral type apparatus has a disadvantage in that a considerably high fluid pressure loss or pressure drop is produced in the second passage, that is the feed solution passage, compared with the axial-spiral type apparatus. Such high fluid pressure loss in the feed solution passage presents various problems in the running of the apparatus. For example, one problem is that the operational fluid pressure of the feed solution must be increased by a pressure corresponding to the fluid pressure loss, to ensure continuation of the feed solution supply to the second passage for the feed solution. This results in a high consumption of electric power by a feeding pump. Further, it should be noted that the apparatus, in general, comprises: a cylindrical chamber where the feed solution is fed by the pump; and, a module, mounted in the chamber, including the mandrel, the spacing layers and membrane sheets spirally wound about the mandrel. In this connection, the membrane sheets are depressed against the spacing layers and the spacing layers are compressed by the highly pressurized feed solution enclosing the module in the chamber. This leads to decreased performance of the membrane sheets exhibitting the reverse osmosis, and results in difficulty in removal of the materials or impurities having adhered from the feed solution flown into the spacing layer to the spacing layer, as well as the inner surfaces of the membrane sheets. Such disadvantageous problems involved in the spiral-spiral type apparatus as mentioned the above are also presented in a spiral-axial type apparatus, wherein a feed solution is forced to flow spirally, while a permeated solution is forced flow, in a direction parallel to the axis, just like the feed solution in the spiral-spiral type apparatus.

SUMMARY OF THE INVENTION

An object of the present invention is to provide an improvement of the liquid separation apparatus of the spiral-spiral type, which avoids the above mentioned disadvantages of the prior art apparatus, and thus, to provide a liquid separation apparatus which has a feed solution passage, where the feed solution is forced to flow spirally in a direction perpendicular to the axis over most of the entire length of the flow path, and then, is forced to change its flow direction to an axial direction, and which is allowed to operate without increased fluid pressure loss in the feed solution passage, compared with the apparatus where the feed solution in a spiral feed solution passage is forced to flow in a direction parallel to the axis, while substantial adherence of solid materials or contaminates contained in the feed solution to the inner surfaces of the membrane sheets and the spacing layer sandwiched therebetween is prevented.

According to the present invention, a liquid separation apparatus of spiral type includes a membrance module comprising a hollow mandrel having a hole or axially aligned holes on the outer circumference thereof, at least one pair of semipermeable membrane sheets, and at least one pair of first and second spacing layers. Said membrane sheets are spaced apart from each other by said spacing layers and spirally wound about said mandrel to form, with said first spacing layer, a first passage for a permeated solution between the opposite inner surfaces of said sheets and to form, with said second spacing layer, a second passage for a feed solution between the opposite outer surfaces of said sheets. Said first passage is closed at the outer edges of the entire lengths of said sheets and having an outlet opening elongated in the axial direction at the inner edges of the entire lengths of said sheets to communicate with the interior of said mandrel through said hole thereof. Said second passage has a first opening elongated in the axial direction at the outer edges of the entire lengths of said sheets and a second opening at the spiral edges of said sheets in the vicinity of the surface of said mandrel. Said first and second passages are closed at the opposite spiral edges of said sheets over most of the spiral lengths, except for the partial lengths where said second opening is formed. Said second spacing layer for said feed solution consists of an inner layer portion having a specific length in the direction perpendicular to the axis, in the vicinity of said mandrel and the remaining outer layer portion communicating with said first opening. Said inner layer portion has an axial sectional area substantially larger than an axial sectional area of said outer layer portion. Said specific length of said inner layer portion is preferably in conformity with or over the length of said second opening in the direction perpendicular to the axis.

According to the present invention, the above mentioned apparatus may be operated so that said permeated solution is discharged from said first passage into the interior of said mandrel through said hole thereof, while said feed solution is forced either to flow into said second passage from said first opening thereof and the nonpermeated solution is discharged from said second passage through said second opening thereof, or to flow into said second passage through said second opening thereof and the nonpermeated solution is discharged from said second passage through said first opening thereof.

Preferable embodiments of the present invention will now be described in comparision with the prior art, with reference to the attached drawings.

PREFERABLE EMBODIMENTS OF THE PRESENT INVENTION

Figure 1:
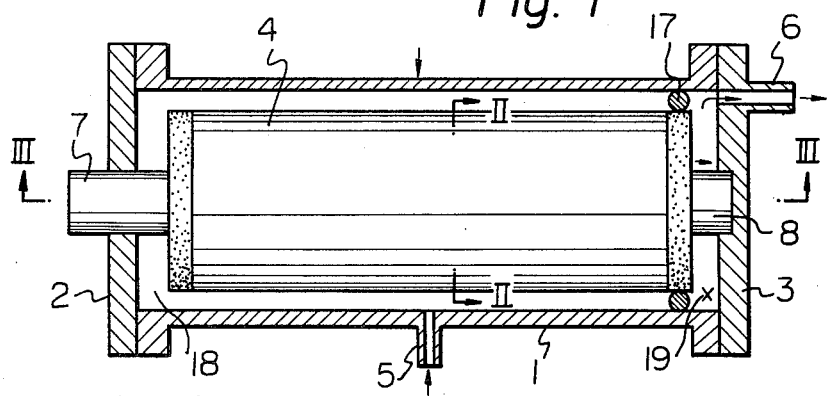
FIG. 1 is a partially sectional elevated view of an embodiment of a separation apparatus of the spiral-spiral type according to the present invention, illustrating a cylindrical chamber with side covers at the opposite ends and a membrane module mounted therein.

FIG. 1 illustrates one embodiment of the apparatus according to the present invention, wherein a module 4, comprising a hollow mandrel 8 with a closed end and an open end, membrane sheets and spacing layers, is mounted coaxially in a cylindrical chamber 1. The opposite ends of the chamber 1 are closed with side covers 2 and 3 at its flanges. The chamber 1 is provided on its circumference with an inlet pipe 5 for a feed solution and with an outlet pipe 6 at one end for the nonpermeated solution, while the module 4 is provided with an outlet conduit 7 connected to the open end of the mandrel 8 for the permeated solution. The space between the module 4 and the inner surface of the chamber 1 is divided into two zones 18 and 19 by a circular sealing member 17, to allow the nonpermeated solution to be discharged out of the chamber 1 without being mixed with the feed solution. The feed solution is introduced into the zone 18 of the chamber 1 under a sufficient pressure to carry out reverse osmosis through the inlet pipe 5, and the chamber 1 is filled with the feed solution. The feed solution flows into the module 4 from an inlet opening 12, elongated axially on the circumferential surface of the module 4, in a direction perpendicular to the axis.

Figure 2:
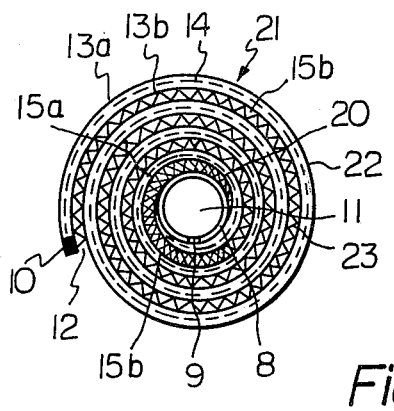
FIG. 2 is a cross sectional view of the module, taken along the line II—II in FIG. 1, illustrating an embodiment of a module having a single passage for a permeated solution and a single passage for a feed solution.
Figure 3:
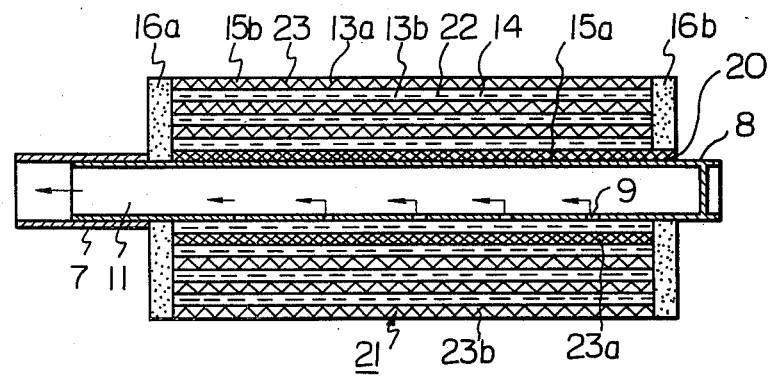
FIG. 3 is an axially sectional view of the module taken along the line III—III in FIG. 1.

As illustrated in FIGS. 2 and 3, the module 4 comprises the hollow mandrel 8 having holes 9, aligned axially on the circumference of the mandrel over the length thereof and open to the interior of the mandrel, and a layer arrangement including two semipermeable sheets 13a and 13b and two kinds of spacing layers 22 and 23, the layer arrangement being spirally wound about the mandrel 8. Each membrane sheet is fixed to the circumferential surface of the mandrel 8 at its inner edge with bonding material. The sheets 13a and 13b are closed at the opposite side edges and the outer edges to form an envelope wherein one of the spacing layers 22 referred to as a first spacing layer hereinafter, is disposed. The first spacing layer 22 with the two sheets 13a and 13b forms a first passage 14 for the permeated solution, which is open to communicate with the interior of the mandrel 8 through the holes 9, while it is closed with a sealing material 10 at the outer edges of the sheets 13a and 13b. The other spacing layer 23, referred to as a second spacing layer hereinafter, is disposed adjacent the outer surfaces of the two sheets, in the spirally wound layer arrangement, to form with the two sheets 13a and 13b, a second passage 15 for the feed solution. The second or feed solution passage 15 is open at the outer edges of the sheets over the axial lengths thereof to allow the feed solution in the zone 18 of the chamber 4 to flow into the passage in a direction perpendicular to the axis, while it is closed at the inner edges of the sheets over the axial lengths thereof by the mandrel 8. The feed solution passage 15 is closed at the spiral side edges of the sheets over the entire spiral length by a sealing member 16a, while it is closed by another sealing member 16b at the opposite spiral side edges of the sheets over most of the spiral lengths, except for a part of the length, in the vicinity of the mandrel surface forming an outlet opening 20. That is, the feed solution passage 15 is partially and axially open at the spiral edges of the sheets near the mandrel surfaces to allow the nonpermeated solution to be discharged out of the module 4. The nonpermeated solution in the second spiral passage 15 is forced to flow through the axial outlet opening 20 into the zone 19 of the chamber 1 and, then, is discharged out of the chamber 1 through the outlet conduit 6; while the permeated solution in the first spiral passage 14 is forced to flow through the axially aligned holes 9 into the interior of the mandrel 8 and, then, is discharged out of the outlet conduit 7.

The sealing members 16a and 16b form the opposite ends of the module 4 and serve not only to prevent the feed solution from flowing into the module in the axial direction but, also, to hold the spiral sheets 13a and 13b and the first and second spacing layers 22 and 23 at the opposite spiral edges thereof, together with the mandrel 8, in a rigid state.

The feed solution passage 15, formed by the second spacing layer 23 with the sheets 13a and 13b, is designed so that its inner portion adjacent the mandrel 8 has an axially sectional area larger than that of the other portion, following the inner portion and having the outer edge open to the zone 18 of the chamber 4. The second spacing layer 23 for the feed solution is preferably made of a porous material, a waved net-like material, knitted goods and woven fabric, net, non woven fabric or paper like material.

The above mentioned embodiment is directed to the apparatus having the module provided with only two membrane sheets 13a and 13b.

Figure 4:
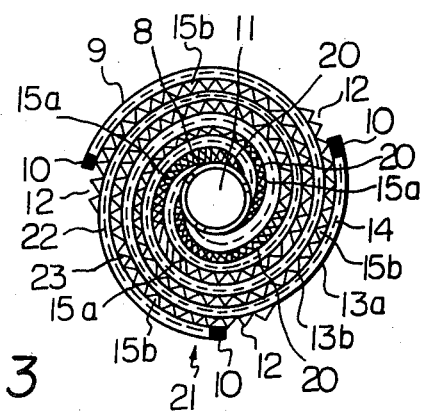
FIG. 4 is a cross sectional view of the module taken along the line IV—IV in FIG. 1, which illustrates another embodiment of the module, with three passages for the permeated solution and three passages for the feed solution.

FIG. 4 illustrates another embodiment of the module illustrated in FIG. 1, wherein three pairs of first and second spacing layers are spirally wound with the necessary membrane sheets about a hollow mandrel in overlapping relation to form three spiral passages for the feed solution and the corresponding spiral passages for the permeated solution. Each pair formed by the feed solution passage and the permeated solution passage corresponds to that illustrated in FIG. 2 in its arrangement. The elements and members in the module illustrated in FIG. 4 are denoted by the same numerals as the corresponding ones in the module illustrated in FIG. 2.

The larger the dimension of the module with the longer the spiral lengths of the feed solution passage and permeated solution passage, the greater the loss of fluid pressure. Therefore, in order to decrease the loss of fluid pressure, it is preferable to adopt a module as illustrated in FIG. 4 rather than that in FIG. 2, because the greater the number of feed solution passages provided in a module having the same dimensions, the shorter the spiral length of each passage. The number of pairs of membrane sheets can be increased as desired.

With the above mentioned apparatus of the present invention, it should be noted that a feature of the present invention resides in the fact that the axially sectional area of an inner portion 15a of the feed solution passage 15, which portion is located in the vicinity of the mandrel 8, is larger than that of the remaining outer portion 15b. To enlarge the axial sectional area, the spacing layer 23 for the feed solution is designed so that the thickness of an inner layer portion 23a in the vicinity of the mandrel 8 is larger than that of the remaining outer layer portion 23b. The reasons for such arrangement of the spacing layer for the feed solution are as follows.

In the above mentioned apparatus, a pressure loss of the fluid flowing through the feed solution passage can be expressed by the following formula (1).

$$P = f_1 \frac{l_1}{2h_1} U_1^2 + f_2 \frac{l_2}{2h_2} \overline{U_2}^2 \qquad (1)$$

wherein:

$\Delta p$: a pressure loss or pressure drop of fluid over the entire length of the feed solution passage 15;

$l_1$: the entire length of the feed solution passage 15 or the second spacing layer 23 in the direction perpendicular to the axis of the mandrel 8;

$f_1$: the coefficient of friction or fluid resistance between the fluid and the outer layer portion 23o of the second spacing layer 23;

$h_1$: the thickness of an outer layer portion 23b following an inner layer portion 23a in the vicinity of the mandrel 8, of the second spacing layer 23 forming the second solution passage 15 with the neighbouring membrane sheets 13a and 13b;

$l_2$: the axial widths of the membrane sheets 13a and 13b or the axial width of the second spacing layer 23;

$f_2$: the coefficient of friction or fluid resistance between the fluid and the inner layer portion 23a, of the second spacing layer 23, in the vicinity of the mandrel 8.

$h_2$: a thickness of the inner layer portion 23a, of the second spacing layer 23, in the vicinity of the mandrel 8;

$U_1$: the flow velocity, in the direction perpendicular to the axis, of the outer portion of the fluid following an inner portion thereof, in the vicinity of the mandrel 8, through the feed solution passage 15;

$\overline{U_2}$: the average axial flow velocity of the inner portion of the fluid in the vicinity of the mandrel, which is an arithmetic mean of the axial flow velocity (zero) at the closed spiral edge of the feed solution passage and an axial flow velocity at the spiral outlet opening 20.

Figure 5:
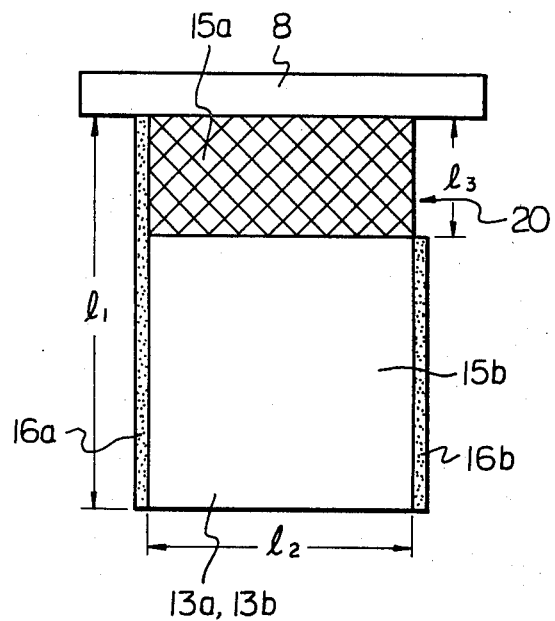
FIG. 5 is a diagrammatic developed plane view illustrating the module of FIG. 2.
Figure 6:
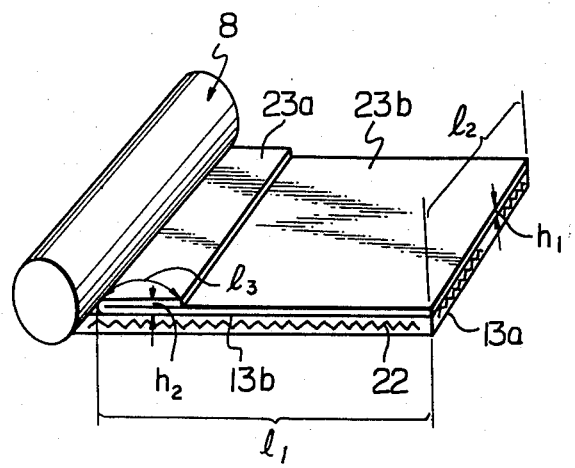
FIG. 6 is a diagrammatic perspective view illustrating the developed module of FIG. 5.

Referring to FIGS. 5 and 6 and the formula (1) above, the first term at the right side of the formula represents a pressure loss of the fluid flowing in the direction perpendicular to the axis through the outer portion 15b of the feed solution passage 15 far from the mandrel 8, and this may be referred to as $\Delta P_1$. The second term at the right side of the formula represents a pressure loss of the fluid flowing axially through the inner portion 15a of the feed solution passage 15 near the mandrel 8 after the flow direction has been changed from the direction perpendicular to the axis to the axial direction, and this may be referred to as $\Delta P_2$.

The entire pressure loss of the fluid $\Delta P$ may be reduced by lowering $\Delta P_1$ or $\Delta P_2$. However, the lowering of $\Delta P_2$ is not preferable for the following reasons.

$\Delta P_1$ may be lowered by decreasing $l_1$ and increasing $h_1$. This lowering action results in a reduction of the performance of the apparatus. The other way in which $\Delta P_2$ may be lowered is to decrease $f_1$, however, this involves a problem. That is, it is difficult to adopt a spacing layer for the feed solution exhibitting a lower fluid resistance against the fluid than a net like material of synthetic high polymer which is used as a spacing layer for the feed solution in a conventional apparatus. The conventionally used net like material is of a thickness of from 100 μm to 1500 μm, with a voids ratio of from 50% to 90%.

In the present invention, the lowering of $\Delta P_2$ for the reduction of $\Delta P$ is adoped, and $\Delta P_2$ is lowered by enlarging the axially sectional area of the inner lower portion 23a, of the spacing layer 23, in the vicinity of the mandrel 8. FIGS. 5 and 6 illustrate an embodiment of the enlarged inner layer portion of the spacing layer. Referring to FIGS. 5 and 6, the inner layer portion 23a (hatched area in FIG. 5) of the spacing layer 23 is enlarged in its axially sectional area, compared with the outer layer portion 23b, by increasing the thickness $h_2$ of the inner layer portion 23a, while maintaining, over the length, the axial width of the inner layer portion 23a the same as that of the outer layer portion 23b. That is, the thickness $h_2$ of the inner layer portion 23a is larger than the thickness $h_1$ of the outer layer portion 24b, while the axial width of the inner layer portion 23a is the same as that of the outer layer portion 23b over the length.

The above mentioned arrangement of the spacing layer according to the present invention does not cause a substantial decrease in effective area of the membrane sheet, and thus, does not lead to a substantial reduction of performance of the liquid separation apparatus, while it causes $\Delta P_2$ to be reduced to a great extent.

The enlargement of the thickness of the inner layer portion 23a, of the spacing layer 23, may be carried out by folding a sheet of a layer element into two, as illustrated in FIG. 6, or more, at the inner edge portion over a specific length $l_3$, or piling one or a plurality of shorten layer elements on a basic longer layer element at the inner edge portion thereof over a specific length $l_3$. However, methods of enlarging the axially sectional area of the inner layer portion 23a are not limited to the above methods.

The above mentioned length $l_3$ is preferably in conformity with or over the length of the axial outlet opening 20 in the direction perpendicular to the axis.

The characteristics of the enlarged inner layer portion of the spacing layer are required to be the same as those of a conventional spacing layer for the feed solution consisting of a single sheet of a layer element having a uniform thickness over its entire length. That is, the enlarged inner layer portion of the spacing layer is required to have a coefficient of friction $f_2$ as small as possible and have a voids ratio as high as possible.

Preferably spacing layers for the feed solution are formed by layer elements of high polymer selected from polyethylene, polypropylene, polyester, polycarbonate, polyvinyl chloride or the like. The selection of the material is made in consideration of the characteristics of the feed solution, so that the material is stable in either its physical aspect or chemical aspect.

An increase in the length $l_3$ of the enlarged inner layer portion 23a in the direction perpendicular to the axis causes $\Delta P_2$ to be reduced. However, an excessibly large length of the inner layer portion 23a leads to the occurence of unequally distributed fluid flow in the elongated inner layer portion. Such unequally distributed fluid flow consists of local streams of higher velocities and lower velocities in the inner layer portion 23a. The local streams with the lower velocities cause the solid materials contained in the feed solution to adhere to and be deposited on the portions of the spacing layer and/or the surfaces of the membrane sheets where the streams are located. Such deposit leads to a reduction of the performance of the apparatus.

An excessively small length of the inner layer portion 23a causes $\Delta P_2$ to be increased, and thus, it is disadvantageous as explained before.

In consideration of the above matters, the inventors have found that a liquid separation apparatus of the spiral-spiral type having a relationship among $h_1$, $h_2$, $l_2$ and $l_3$ represented by the following formula (2) is advantageous over the prior art apparatus of the spiral-spiral type.

$$4 > S > 0.8 \qquad (2)$$

where:

$$S = \frac{S_1}{S_2} = \frac{\phi_1 \cdot l_2 \cdot h_1}{\phi_2 \cdot l_3 \cdot h_2}$$

$\phi_1$: the voids ratio of the outer layer portion 23b of the spacing layer 23 for the feed solution;

$\phi_2$: the void ratio of the inner layer portion 23a of the spacing layer 23 for the feed solution.

$S_1$: an axial sectional area of the outer layer portion 23b, at the inlet opening 12, through which the fluid is allowed to pass freely;

$S_2$: a cross sectional area of the inner layer portion 23a, at the axial outlet opening 20, through which the fluid is allowed to pass freely.

The voids ratio $\phi$ is determined by the following method. A specimen of the spacing layer, for example, having an area of 20×40 cm$^2$, is prepared. The thickness of the specimen is measured and then an apparent volume Va of the specimen is calculated by using the data of the area and the thickness. The specimen is cut into fine pieces, which are to be dispersed into water contained in a vessel. A real volume V is calculated by using a volume by which the volume of the water in the vessel is increased. The voids ratio $\phi$ is then calculated from the following formula by using the date of V and Va.

$$\phi = \frac{Va - V}{V}$$

However, even if the above formula (2) is satisfied, compliance with the requirement defined by the following formula (3) is preferable.

$$0.5 > K > 0.1 \qquad (3)$$

where:

$$K = \frac{l_3}{l_1}$$

If K is excessively large, the feed solution is allowed to flow in unequal distribution, with the result that deposit of the materials occurs, and thus, the performance of the apparatus is reduced. In view of this, K should be less than 0.5. Contrary to this, there is no specific lower limit of K. However, preferably K is more than 0.1.

More preferably $$0.3 > K > 0.1$$

The above mentioned relationships are also preferably applied to a liquid separation apparatus of the spiral-spiral type having a plurarity of feed solution passages as illustrated in FIG. 4. Further, it should be noted that these relationships are preferably applied to the above mentioned apparatus of the spiral-spiral type even in a case where, for example, the apparatus illustrated in FIGS. 1, 2 and 3 is operated so that the feed solution is forced to flow from the zone 19 of the chamber 1 into the inner portion 15a of the feed solution passage 15 through the axial outlet opening 20, and then, passes through the outer portion 15b of the feed solution passage 15 toward the inlet opening 12, through which it is discharged into the zone 18 of the chamber 1.

The above mentioned apparatus of the present invention has the advantages over the prior art that electric power used in operation of the apparatus is greatly reduced, and damage to the menbrane sheets and the other members owing to the feed solution was considerably reduced. This is because the loss of fluid pressure in the feed solution passage is reduced.

Further, the apparatus has the advantages over the prior art that the length of time required for maintenance of the apparatus, such as the cleaning thereof, is shortened and, therefore, a longer period of operation of the apparatus is attained. As a result, the efficiency of operation is considerably improved, compared with the conventional apparatus of spiral-spiral type or spiral-axial type. This is because, occurrence of the unequally distributed fluid flow accompanied by a shortened path flow is prevented in the enlarged inner layer portion 23a.

Still further, the apparatus has an advantage that the performance of the apparatus is not reduced even though the axially sectional area of the inner layer portion 23a in the vicinity of the mandrel is enlarged, compared with that of the outer layer portion 23b. This is because the enlarged sectional area or thickness of the inner layer portion 23a does not result in an effective surface area of the membrane sheet to be reduced.

EXAMPLE

An apparatus as illustrated in FIGS. 1 and 2 was used. In the apparatus, there was employed a second spacing layer of polypropylene for the feed solution, as illustrated in FIG. 6, having dimensions of $l_1 = 100$ cm, $l_2 = 80$ cm, $l_3 = 20$ cm, $h_1 = 0.05$ cm and $h_2 = 0.1$ cm. The spacing layer had a net structure and its outer layer portion 23b had a voids ratio $\phi_1$ of 0.8, while its inner layer portion 23a also had a voids ratio $\phi_2$ of 0.8. Accordingly, the value of S calculated from the formula (2) was 2, while a value of K calculated from the formula (3) was 0.2.

The coefficients of friction $f_1$ and $f_2$ between the fluid and the spacing layer 23 were $1 \times 10^6$, respectively. In the apparatus, two sheets of semipermeable membrane made of cellulose acetate were employed as the membrane sheets 13a and 13b.

Water at a temperature of 25° C., under a supplying pressure of 30 kg/cm$^3$, was fed into the apparatus from the inlet pipe 5, and a loss of fluid pressure $\Delta P$ in the feed solution passage 15 was measured. The measured loss of fluid pressure $\Delta P$ was 2.3 kg/cm$^2$, while the value of the loss of fluid pressure $\Delta P$ calculated theoretically was 2.4 kg/cm$^2$.

The coefficient of friction f was determined by using an apparatus of an spiral-axial type, wherein the feed solution is forced to flow axially through a spacing layer of the same thickness, material, structure and voids ratio $\phi$ as those of the spacing layer in question. This method of determining the value of f is based on the assumption that the spacing layer used in the spiral-axial type apparatus has f of the same value as that used in the spiral-axial type apparatus. Therefore, f was calculated from a function of $\Delta P$ by using measured values of $\Delta P$, $\phi$ and flow velocity u.

The above mentioned and below mentioned calculated values of $\Delta P$ were calculated from the formula (1), mentioned above.

Control 1

An apparatus which was the same as that used in the Example was employed, except that $h_2$ was 0.05 cm. The apparatus was operated under the same conditions as those in the Example. In this case, S and 4 and K was 0.2. The measured value of the loss of fluid pressure $\Delta P$ in the feed solution passage 15 was 7.3 kg/cm$^3$, while the value of the loss of fluid pressure $\Delta P$ calculated theoretically was 7.5 kg/cm$^3$.

Control 2

First and second apparatus which were the same as that in Example were employed except that the values of $l_3$ in the first and second apparatus were 50 cm and 10 cm, respectively. In the first apparatus S was 0.8 and K was 0.5, while in the second apparatus S was 4 and K was 0.1. In each apparatus, an aqueous solution of calcium sulfate of 2000 ppm, at a temperature of 25° C., was supplied into the feed solution passage 15 under a suppling pressure of 30 kg/cm$^3$. In each case, the apparatus was operated for 48 hours with a recovering ratio of permeated solution to the feed solution of 20%.

As a result, the value of the measured pressure loss of the fluid $\Delta P$ in the feed solution passage in the first apparatus was 1.7 kg/cm$^2$, while the value of the pressure loss of the fluid $\Delta P$ calculated theoretically was 1.8 kg/cm$^2$. In the second apparatus, the value of the measured pressure loss of the fluid $\Delta P$ in the feed solution passage was 4.7 kg/cm$^2$, while the value of the pressure loss of the fluid $\Delta P$ calculated theoretically was 4.5 kg/cm$^2$.

The deposit of calcium sulfate on the opposite surfaces of the two membrane sheets between which the spacing layer for the feed solution was disposed was substantially produced in the first apparatus, while an amount of deposit was negligible in the second apparatus. The amount of the deposit in the first apparatus was about 10 g per 12,000 cm$^2$ (2×l$_1$×l$_2$), when the apparatus was operated for 48 hours.

The results of the Example and Controls are summarized in the following Table.

|  | Control 2 | Example | Control 1 | Control 2 |
|---|---|---|---|---|
| S | 0.8 | 2 | 4 | 4 |
| K | 0.5 | 0.2 | 0.2 | 0.1 |
| Pressure Loss of the fluid ΔP (measured) kg/cm$^2$ | 1.7 | 2.3 | 7.3 | 4.7 |
| Pressure Loss of the Fluid ΔP (calculated) kg/cm$^2$ | 1.8 | 2.4 | 7.5 | 4.5 |
| Deposit of Calcium Sulfate on Membrane Sheet Surface | Recognized (10 g) | — | — | negligible |

As will be understood from the above Table, the pressure loss of fluid ΔP is lower in the case of S=0.8 than in the case of S>0.8. However, the case of S=0.8 is disadvantageous in that a substantial amount of the deposit is produced and an unequally distributed fluid flow occurs. In the case of S=4, a favorable effect or result from employment of the enlarged inner layer portion 23a, of the spacing layer 23 for the feed solution, is not obtained.

What is claimed is:

1. In a liquid separation apparatus of spiral type including a membrane module comprising, a hollow mandrel having a hole or axially aligned holes on the outer circumference thereof, at least one pair of semipermeable membrane sheets, and at least one pair of first and second spacing layers, said membrane sheets being spaced apart from each other by said spacing layers and spirally wound about said mandrel to form, with said first spacing layer, a first passage for a permeated solution between the opposite inner surfaces of said sheets and to form, with said second spacing layer, a second passage for a feed solution between the opposite outer surfaces of said sheets, said first passage being closed at the outer edges of the entire lengths of said sheets and having an outlet opening elongated in the axial direction at the inner edges of the entire lengths of said sheets to communicate with the interior of said mandrel through said hole thereof, said second passage having a first opening elongated in the axial direction at the outer edges of the entire lengths of said sheets and a second opening at the spiral edges of said sheets in the vicinity of the surface of said mandrel, said first and second passages being closed at the opposite spiral edges of said sheets over most of the spiral lengths except for the partial lengths where said second opening is formed; the improvement wherein said second spacing layer for said feed solution consists of an inner layer portion, having a specific length in the direction perpendicular to the axis, in the vicinity of said mandrel and the remaining outer layer portion communicating with said first opening, said inner layer portion having an axial sectional area substantially larger than an axial sectional area of said outer layer portion.

2. A liquid separation apparatus according to claim 1, wherein said second spacing layer has a uniform axial width over the entire length, said inner layer portion having a thickness substantially larger than a thickness of said outer layer portion.

3. A liquid separation apparatus according to claims 1 or 2, wherein said second spacing layer consists of at least one sheet of layer element, said layer element being folded into two or folded more than once at the inner edge portion over said specific length of said inner layer portion to form said inner layer portion being in a multiple layers arrangement.

4. A liquid separation apparatus according to claims 1 or 2, wherein said second spacing layer consists of a basic long layer element and one or a plurality of short layer elements, said short layer elements being piled on said basic long layer element at the inner edge portion over said specific length of said inner layer portion to form, with said basic layer, said inner layer portion being in a multiple layer arrangement.

5. A liquid separation apparatus according to claims 1 or 2, wherein a ratio of an axial sectional area of said outer layer portion at said first opening, through which the fluid is allowed to pass freely S$_1$ to a cross sectional area of said inner layer portion, at said second opening, through which the fluid is allowed to pass freely S$_2$ is represented by the following formula and is in the range between 0.8 and 4, $$S_1/S_2 = \frac{\phi_1 \cdot l_2 \cdot h_1}{\phi_2 \cdot l_3 \cdot h_2}$$

wherein:
φ$_1$: a voids ratio of said outer layer portion
φ$_2$: a voids ratio of said inner layer portion
l$_2$: an axial width of said outer layer portion
l$_3$: said specific length of said inner layer portion
h$_1$: a thickness of said outer layer portion
h$_2$: a thickness of said inner layer portion.

6. A liquid separation apparatus according to claims 1 or 2, wherein said specific length l$_3$ of said inner layer portion is in conformity with or over the length of said second opening in the direction perpendicular to the axis.

7. A liquid separation apparatus according to claims 1 or 2, wherein said feed solution is forced to flow into said second passage from said first opening thereof and the nonpermeated solution is discharged from said second passage through said second opening thereof, while said permeated solution is discharged from said first passage into the interior of said mandrel through said holes thereof.

8. A liquid separation apparatus according to claims 1 or 2, wherein said feed solution is forced to flow into said second passage through said second opening thereof and the nonpermeated solution is discharged from said second passage through said first opening thereof, while said permeated solution is discharged into the interior of said mandrel through said holes thereof.

9. A liquid separation apparatus according to claims 1 or 2, wherein said second spacing layer is made of a net like material of high polymer selected from a group consisting of polyethylene, polypropylene, polyester, polyvinyle chloride and polycarbonate.

10. A liquid separation apparatus according to claims 1 or 2, wherein said second spacing layer is made of a net like material including at least one kind of material selected from the group consisting of knitted goods and woven fabric, net, non woven fabric and paper like material.

11. A liquid separation apparatus according to claims 1 or 2, wherein said second spacing layer is made of a net like material having a thickness of from 100 μm to 1500 μm and a voids ratio of from 50% to 90%.

12. A liquid separation apparatus according to claims 1 or 2, wherein a ratio of said specific length of said inner layer portion to the entire length of said second spacing layer is in the range between 0.1 and 0.5.

* * * * *